A. H. SUPLEE, dec'd.
G. E. BUTLER & A. H. SUPLEE, Executors, M. M. JOHNSTON, assignee.
Shank for Tools.
No. 9,472. Reissued Nov. 16, 1880.
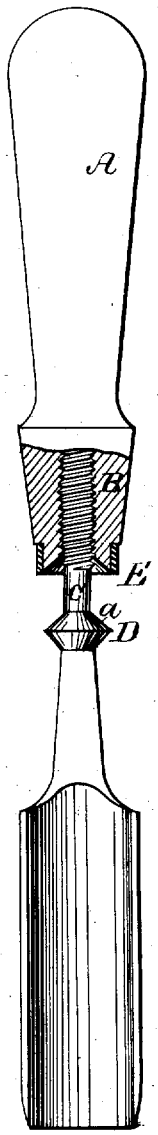
Witnesses:
E. C. Brick
L. A. Bailey
Albert H. Suplee deceased
Inventor:
M. M. Johnston assignee
by W. Bailey his atty

UNITED STATES PATENT OFFICE.

MELVILLE M. JOHNSTON, OF NEW YORK, N. Y., ASSIGNEE, BY MESNE ASSIGNMENTS, OF GEORGE E. BUTLER AND ALBERT H. SUPLEE, EXECUTORS OF ALBERT H. SUPLEE, DECEASED.

SHANK FOR TOOLS.

SPECIFICATION forming part of Reissued Letters Patent No. 9,472, dated November 16, 1880.

Original No. 133,498, dated November 26, 1872. Application for reissue filed August 27, 1880.

*To all whom it may concern:*

Be it known that ALBERT H. SUPLEE, late of San Francisco, in the county of San Francisco and State of California, deceased, did in his life-time invent a certain new and useful Improvement in Shanks for Tools, of which the following is a specification.

This invention relates to tools in which a removable tool-shank is detachably connected with the handle by screwing the same into a screw-threaded socket formed in the handle.

The invention consists in forming the handle with a socket, one part of which is internally screw-threaded to engage a corresponding screw-thread on the shank, and another part of which is made tapering or conical to form a seat, into or against which the tool-shank, when the tool is screwed into the handle, will be tightly jammed. The effect is to accurately center the tool, to hold it firmly and tightly in place, and to prevent it from rattling or shaking in its socket, the conical or tapered form of that portion of the socket in which the tool is seated serving to compensate for inequalities and to take up wear. With a view to still further insure this result the tool-shank is also made (as to that portion which enters the tapered part of the socket) of a correspondingly tapered or conical form, so that the shank may have an extended bearing-surface in contact with the tapered portion of the socket.

In the accompanying drawing is represented a view, partly in section, of a tool possessing the several characteristics as above specified.

A represents the handle, constructed preferably of wood or other similar material, which is provided with a socket suitably screw-threaded to receive the correspondingly screw-threaded tool-shank C, and also with a conical or beveled recess or seat, E. It also has the usual binding-ferrule to prevent it from splitting. The tool-shank C is screw-threaded, as shown at B, and the inner face of its bolster D—that is to say, the face next to the handle—has a beveled or conical part or bearing, *a*, of a shape corresponding to that of the seat E. The two parts are united by simply screwing the one into the other. This acts to draw the handle and tool together and to force the beveled bearing *a* firmly and tightly into the seat E.

It is not new to provide a tool-shank with a screw-thread and bolster, and to secure the shank to the handle by screwing them together. Heretofore, however, the part of the bolster that bears upon the end of the handle has been made flat, as may be seen in the patent to James M. De Witt, May 4, 1869, which is hereby fully disclaimed; but in the device shown in the drawing the handle is formed with a socket, of which one part is tapered or conical and another portion is screw-threaded, so that a tool-shank engaging said screw-threaded portion of the socket may be centered and jammed tightly in the tapered portion of said socket; and, furthermore, in the bolstered tool-shank shown in the drawing the bolster is beveled and not flat on its bearing-face.

What I claim as the invention of said SUPLEE is as follows:

1. A tool-handle formed with a tool-receiving socket, of which one portion is screw-threaded and another portion is tapered or conical, as and for the purposes hereinbefore set forth.

2. A tool having a shank screw-threaded and formed or provided with a conical or beveled bearing portion, in combination with a handle having a screw-threaded socket to receive the screw-threaded portion of the tool-shank, and a conical or beveled seat, into which the correspondingly conical or beveled part of the shank is forced when the tool and handle are screwed together, substantially as hereinbefore set forth.

3. In a tool in which the handle and shank are screwed together as described, a conical or beveled seat in the one part, and on the other part a correspondingly conical or beveled bearing portion, which is forced tightly into said seat when the two parts are screwed together, substantially as hereinbefore set forth.

In testimony whereof I have hereunto set my hand this 19th day of August, 1880.

MELVILLE M. JOHNSTON,
*Assignee.*

Witnesses:
MELVILLE STRONG,
J. W. SELBY.